US012792027B2

(12) United States Patent
Hofmann et al.

(10) Patent No.: US 12,792,027 B2
(45) Date of Patent: Nov. 10, 2026

(54) OPERATING A TRANSPORT SYSTEM USING GENERATED LIST OF TRANSPORT ELEMENT INSTANCES FOR EACH STATION

(71) Applicant: Schneider Electric Industries SAS, Rueil-Malmaison (FR)

(72) Inventors: Steffen Hofmann, Steinfeld (DE); Jürgen Heid, Altertheim (DE)

(73) Assignee: Schneider Electric Industries SAS, Rueil-Malmaison (FR)

( * ) Notice: Subject to any disclaimer, the term of this patent is extended or adjusted under 35 U.S.C. 154(b) by 600 days.

(21) Appl. No.: 18/211,659

(22) Filed: Jun. 20, 2023

(65) Prior Publication Data

US 2024/0085893 A1 Mar. 14, 2024

(30) Foreign Application Priority Data

Jun. 23, 2022 (EP) .................................... 22305911

(51) Int. Cl.

*G05B 19/418* (2006.01)
*B65G 54/02* (2006.01)
*H02K 41/03* (2006.01)

(52) U.S. Cl.

CPC ......... *G05B 19/4189* (2013.01); *B65G 54/02* (2013.01); *H02K 41/031* (2013.01);
(Continued)

(58) Field of Classification Search

CPC ...... G05B 19/4189; G05B 2219/31276; G05B 2219/31274; G05B 2219/31432;
(Continued)

(56) References Cited

U.S. PATENT DOCUMENTS 10,865,054 B2 * 12/2020 Ahammer ........ G05B 19/41865
2018/0009605 A1 * 1/2018 Collin ................. B65G 1/1378
(Continued)

FOREIGN PATENT DOCUMENTS

DE 102008059529 A1 6/2010
EP 3196719 A2 7/2017
(Continued)

OTHER PUBLICATIONS

European Search Report and Search Opinion dated Dec. 9, 2022 for corresponding European Patent Application No. 22305911.4, 9 pages.

*Primary Examiner* — Rami R Okasha
(74) *Attorney, Agent, or Firm* — Wolf, Greenfield & Sacks, P.C.

(57) ABSTRACT

A method serves to operate a transport system, in particular a multi-carrier system, that comprises a plurality of linear motors that are arranged in a row and have a guide track, a plurality of transport elements that can be moved along the guide track by means of the linear motors, and a plurality of stations along the guide track, wherein each of the transport elements is associated with one of the stations. The method has the following steps:

Figure 1:
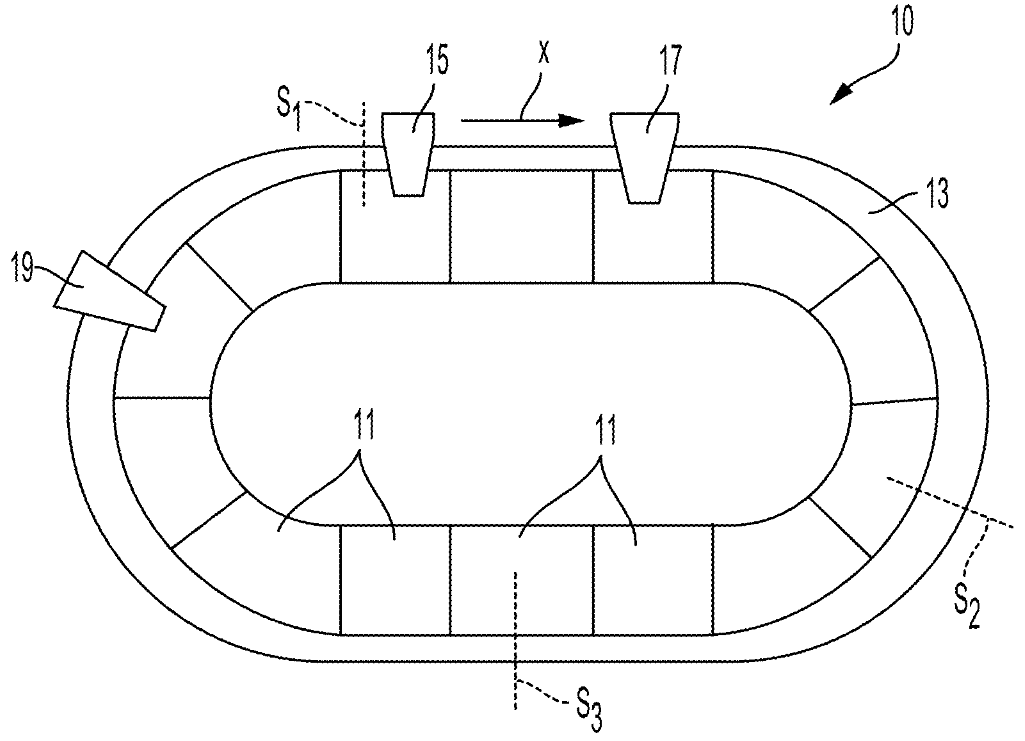

generating an instance for each of the transport elements, generating a list for each of the stations, wherein the instance for each of the transport elements associated with the respective station is associated with the list, and wherein, within the respective list, the instance of each transport element is linked to the instance of the transport element directly ahead of the observed transport element and to the instance of the transport element directly behind the observed transport element, transferring a transport element from a first station to a directly following second station and inserting the instance of this transport element into the list of the (Continued)

second station if a transport job that goes beyond the first station is present for the transport element, wherein the transfer of the instance takes place in an event-controlled manner and independently of a transfer point if a predetermined transfer condition is fulfilled, and controlling the linear motors to execute travel jobs of the transport elements.

20 Claims, 2 Drawing Sheets

(52) U.S. Cl.
CPC .............. *G05B 2219/31274* (2013.01); *G05B 2219/31276* (2013.01); *G05B 2219/31432* (2013.01)

(58) Field of Classification Search
CPC ........ B65G 54/02; B65G 43/00; B65G 35/00; H02K 41/031
See application file for complete search history.

(56) References Cited

U.S. PATENT DOCUMENTS

| | | | | |
|---|---|---|---|---|
| 2018/0085788 | A1* | 3/2018 | Engel | B07C 1/025 |
| 2020/0017308 | A1* | 1/2020 | Huang | B65G 54/02 |
| 2021/0192440 | A1* | 6/2021 | Yang | G06Q 10/087 |
| 2023/0068768 | A1* | 3/2023 | Huang | G05B 19/19 |
| 2025/0011105 | A1* | 1/2025 | Fenile | B65G 47/44 |

FOREIGN PATENT DOCUMENTS

| | | | |
|---|---|---|---|
| EP | 3379719 | A1 | 9/2018 |
| EP | 3422558 | A1 | 1/2019 |
| EP | 3974927 | A1 | 3/2022 |
| WO | 0071445 | A1 | 11/2000 |
| WO | 2006102691 | A2 | 10/2006 |
| WO | 2017186619 | A1 | 11/2017 |

* cited by examiner

OPERATING A TRANSPORT SYSTEM USING GENERATED LIST OF TRANSPORT ELEMENT INSTANCES FOR EACH STATION

CROSS-REFERENCE TO RELATED APPLICATIONS

This application claims priority to and the benefit under 35 U.S.C. §119(a)-(d) of European Patent Application No. 22305911.4, filed on Jun. 23, 2022.

The invention relates to a method for operating a transport system, in particular a multi-carrier system, that comprises a plurality of linear motors that are arranged in a row and have a guide track, a plurality of transport elements that can be moved along the guide track by means of the linear motors, and a plurality of stations along the guide track, wherein each of the transport elements is associated with one of the stations. Furthermore, the invention relates to a transport system, in particular a multi-carrier system, having a control unit that is configured to carry out the method.

The provision of stations along the guide track or path of a transport system is generally known. Such stations are possible starting points and target points for transport elements. Certain actions are often performed at the stations. For example, transport elements can be loaded or unloaded with a product at the stations.

Typically, each station is associated with a waiting position arranged upstream along the path. If a transport element is to be sent to the next station, it receives a travel job up to the corresponding waiting position. Only when it arrives at the waiting position and stops there does the receiving station take over and check whether it is already occupied by another transport element. Only when the station is free does the transport element receive the release to advance into the actual station. However, this also means that the transport element stops briefly in the waiting position even if the station is already free when the transport element arrives in the waiting position. Furthermore, transport elements are stopped in a station or their waiting position even if they have a travel job to a downstream station. The (upstream) station detects this and only then transfers the transport element to the next (downstream) station.

Such transfer points have so far been necessary to ensure an orderly transfer of a transport element from one station to the next station so that each station knows the transport elements associated with it. For this purpose, each station furthermore has to have an available memory that corresponds to the maximum number of all the transport elements on the path since each station has to be set up to manage all the transport elements at the same time. On the transfer to a station, the respective transport element is noted in the memory and removed from the memory of the previous station. However, the storage of the transport elements or their indexes takes place in an unstructured manner so that additional measures have to be taken to be able to track the sequence of the transport elements associated with the station along the path so that the correct transport elements are addressed. This is costly and requires additional memory.

Furthermore, the possibly multiple and partly unnecessary stopping of the transport elements during the transport job is, however, solely due to organizational aspects and should ideally be avoided. The resulting delays increase as more stations are provided along the path.

It is an object of the present invention to disclose a method for operating a transport system and a transport system with improved handling of transport elements.

This object is satisfied by the subjects of the independent claims. Advantageous embodiments are the subject of the dependent claims and result from the description and the drawings.

The method in accordance with the invention serves to operate a transport system, in particular a multi-carrier system, wherein the transport system comprises a plurality of linear motors that are arranged in a row and have a guide track, a plurality of transport elements that can be moved along the guide track by means of the linear motors, and a plurality of stations along the guide track, and wherein each of the transport elements is associated with one of the stations. The method has the following steps:

- generating an instance for each of the transport elements,
- generating a list for each of the stations, wherein the instance for each of the transport elements associated with the respective station is associated with the list, and wherein, within the respective list, the instance of each transport element is linked to the instance of the transport element directly ahead of the observed transport element and to the instance of the transport element directly behind the transport element,
- transferring a transport element from a first station to a directly following second station and inserting the instance of this transport element into the list of the second station if a transport job that goes beyond the first station is present for the transport element, wherein the transfer of the instance takes place in an event-controlled manner and independently of a transfer point if a predetermined transfer condition is fulfilled, and

- controlling the linear motors to execute travel jobs of the transport elements.

Each linear motor can in particular have six outer surfaces, namely an upper side, a lower side, an outer side, an inner side, and two side surfaces. In this respect, the side surfaces of adjacent linear motors are spaced apart from one another by a small expansion gap of approximately 0.1 mm to 0.2 mm or directly contact one another. The guide track for the transport elements can be formed at the outer side. The inner side is arranged in the region of an inner space of the transport system.

The transport system or the multi-carrier system can be peripherally formed so that the linear motors form a self-contained guide track along which the transport element or the transport elements can theoretically be endlessly moved in the same direction. However, it is also possible for the linear motors to form an open guide track with a starting point and an end point. A plurality of stations are arranged along the guide track, but they usually only exist virtually and are, for example, defined by a coordinate of the guide track. Such stations are possible starting points and target points for transport elements. For example, a transport element can receive a travel job that causes it to travel from one station to another station, which corresponds to a part section of the guide track. Actions can furthermore be performed at the stations, such as the loading or unloading of the transport element with a product or the coupling or uncoupling of a certain number of consecutive transport elements.

The transport elements are in particular magnetically driven. For this purpose, the transport elements have one or more permanent magnets that are acted on by a driving force by means of a changing and/or wandering magnetic field that is generated by the linear motors. The driving force leads to a movement of the transport elements along the guide track. The transport elements can in particular be moved independently and separately from one another.

Workpieces or products can thereby, for example, be transported along the guide track by means of the transport elements.

To hold the transport elements on the guide track, they are preferably attracted toward the guide track by means of an attractive force in a direction perpendicular to a direction of movement of the transport element. Thus, the attractive force also extends perpendicular to the driving force. The attractive force preferably extends from the guide track toward the linear motors or toward the coils of the linear motor. The attractive force is typically generated in that the magnet of the transport element is attracted by a magnetically conductive stator of the respective linear motor.

The transport element can also be designated as a carrier, a mover, or a runner; the linear motor, on the other hand, can also be designated as a stator.

The generation of an instance for each of the transport elements means that each transport element located on the path or guide track is assigned a virtual image, with the instances preferably having an identical design. An instance pool is so-to-say created so that there is exactly one instance for each transport element. Each of the transport elements, and thus also each instance, is associated with exactly one of the stations, wherein the transport element or the instance can also be transferred, for example from one station to the following station along the guide track.

Each station is furthermore allocated the list comprising the instances currently assigned to the station. Since, within the respective list, the instance of each transport element is linked to the instance of the transport element directly ahead of the observed transport element and to the instance of the transport element directly behind the observed transport element, the station knows the sequence of the transport elements assigned to it. An additional management of the sequence of the transport elements associated with the station along the path is thereby superfluous since the station always knows, based on the list or chain, the first list element that corresponds to the foremost transport element in the direction of movement. The station in particular always issues the next travel job to the first element of the list or chain that is linked to this foremost transport element, in particular to its index.

For the instance of the foremost transport element in the direction of travel that is assigned to the station, i.e. the first instance in the list, the link to the front instance is preferably marked as a link to nothing, for example as a NULL reference. The same applies to the instance of the last transport element in the direction of travel that is assigned to the station, i.e. the last instance in the list. For this instance, the link to the rear instance is preferably marked as a link to nothing. In this way, it can in each case be determined for the station which transport elements are assigned to it, in which sequence they are arranged, and which is the first and which is the last transport element in the direction of movement that is associated with the station. Since exactly one instance is created, viewed globally, for each transport element and not every station has to provide sufficient memory for the maximum number of transport elements on the path, significant memory savings can furthermore be achieved.

Insofar as transport elements “ahead of”, “in front of”, “before” or “behind” the observed transport element are mentioned, this refers to the direction of movement. The transport element “ahead of” or “in front of” therefore refers to a transport element traveling at the front in the direction of movement, while the transport element “behind” the observed transport element refers to a transport element following the observed transport element in the same direction. A “following” (second) station accordingly refers to a station arranged downstream of the observed (first) station in the direction of movement.

If the term “direct” is used in connection with transport elements or stations, this does not include any statement about temporal or spatial intervals, but rather means that there are no further stations or transport elements between the corresponding stations or transport elements.

When a transport element is transferred from one station to a directly following station, the corresponding instance of this transport element is inserted into the list of the second station, i.e. is appended to the last position of the list. Accordingly, the instance is removed from the list of the previous station during the transfer. With the transfer, the responsibility of the stations for the transport element preferably changes so that the stations can execute commands for the transport element.

The transfer takes place in an event-controlled manner and independently of a transfer point (i.e. a, in particular predetermined, point or section on the guide track that can be approached or occupied by a transport element), also referred to as a trigger point. This means that there is no need for a defined transfer point corresponding, for example, to a waiting position to which the transport element first has to be moved. Instead, the transport element can be transferred in an event-based manner, wherein the respective transfer event can be defined almost freely. This makes it possible for the station to which the transport element is transferred to check, if necessary already before the transport element arrives, whether the transport element has to stop before the station because the station is occupied or can immediately enter the station. If the transport element executes a travel job to a station even further downstream, said transport element can furthermore immediately be passed on to the next station even before the transport element arrives. This eliminates an unnecessary stopping in a waiting position and also an unnecessary waiting in a station that is not the destination of the transport element.

In a preferred embodiment, the transfer condition is fulfilled when the transport element has set off and/or has reached a predetermined transfer speed. The transport element can in particular be directly transferred to the next station after it has set off. It is therefore not necessary to wait until the transport element arrives in a waiting position. Rather, the travel path between two stations can already be used so that the arrival station checks whether the station is currently free or occupied and whether it still has to transfer the transport element further to the station following it.

Each instance preferably has the link to the instance of the transport element directly in front of the observed transport element, the link to the instance of the transport element directly behind the observed transport element, and an identification feature for the respective transport element. In this way, it can be reliably determined for each transport element whether there are still transport elements traveling ahead or behind that are associated with the same station, and which transport element it is.

The links can in particular each be configured as pointers referring to memory addresses of the respective instance. The transfer of an instance from the first station to the directly following second station can then take place by overwriting (and in the process accordingly modifying) the memory addresses to which the respective pointers refer. This provides a particularly efficient and fast way of representing the “transfer” of the instance from one list to another list.

More precisely, the instances that are associated with the transport elements located at a station can each form a linked list. Each instance can in this respect have a pointer to the previous and the following instance. The instances of the first and last transport element—on the guide track—can have a null pointer in this respect. If the first transport element now moves from a first station to a second station, the pointers are modified such that the instance of the transport element is integrated into the linked list of the instances of the second station.

The transport system can furthermore have a control unit, wherein a memory area for creating instances for each of the transport elements is provided in the control unit. Thus, a global "pool" of instances is formed in which the instances can be linked via referencing (e.g. by the aforementioned pointers) in the lists or chains without each station having to provide a memory for the maximum, theoretically possible number of transport elements.

The invention furthermore relates to a transport system, in particular a multi-carrier system, that comprises a plurality of linear motors that are arranged in a row and have a guide track, a plurality of transport elements that can be moved along the guide track by means of the linear motors, and a plurality of stations along the guide track. Furthermore, the transport system has a control unit that is configured to carry out the method in accordance with the invention.

In the transport system, the stations can be at least partly arranged at identical positions along the guide track. Since there is no need for transfer points or trigger points in terms of hardware, stations can be defined purely virtually by their position or coordinate along the guide track. This also includes that different stations can be defined at the same position or coordinate that can then perform different functions, for example.

In all other respects, the statements made on the method in accordance with the invention apply accordingly to the transport system in accordance with the invention, and vice versa. It is understood that all the features and embodiments mentioned herein can be combined with one another, unless stated otherwise.

Figure 2:
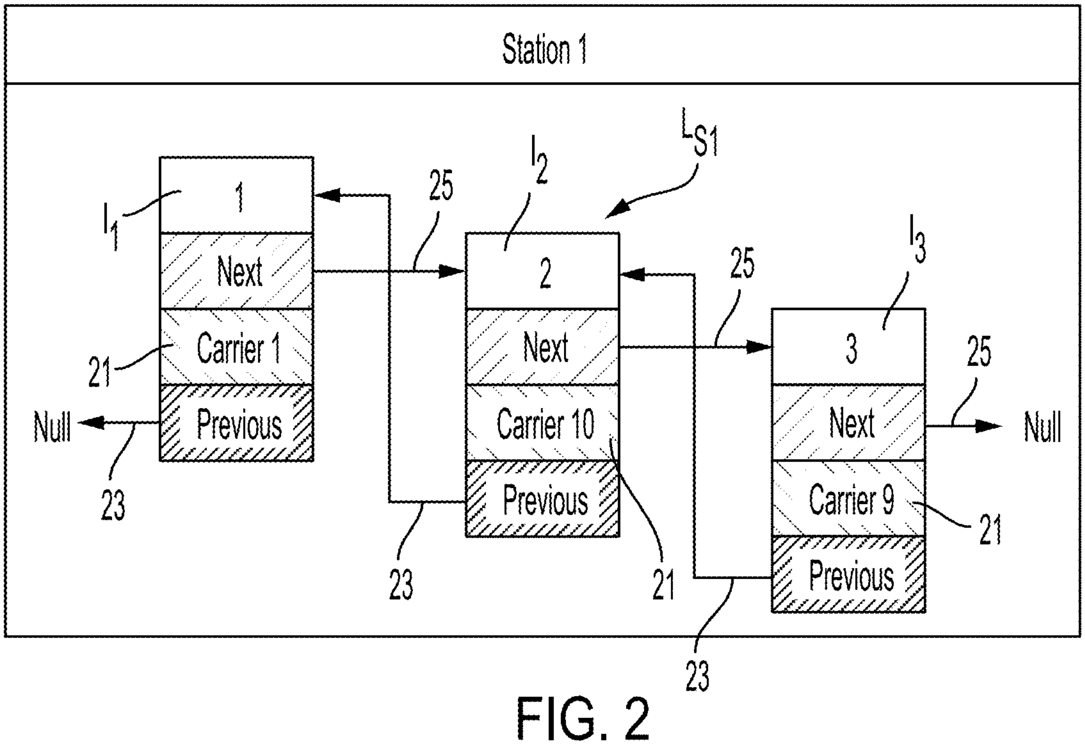
Figure 3:
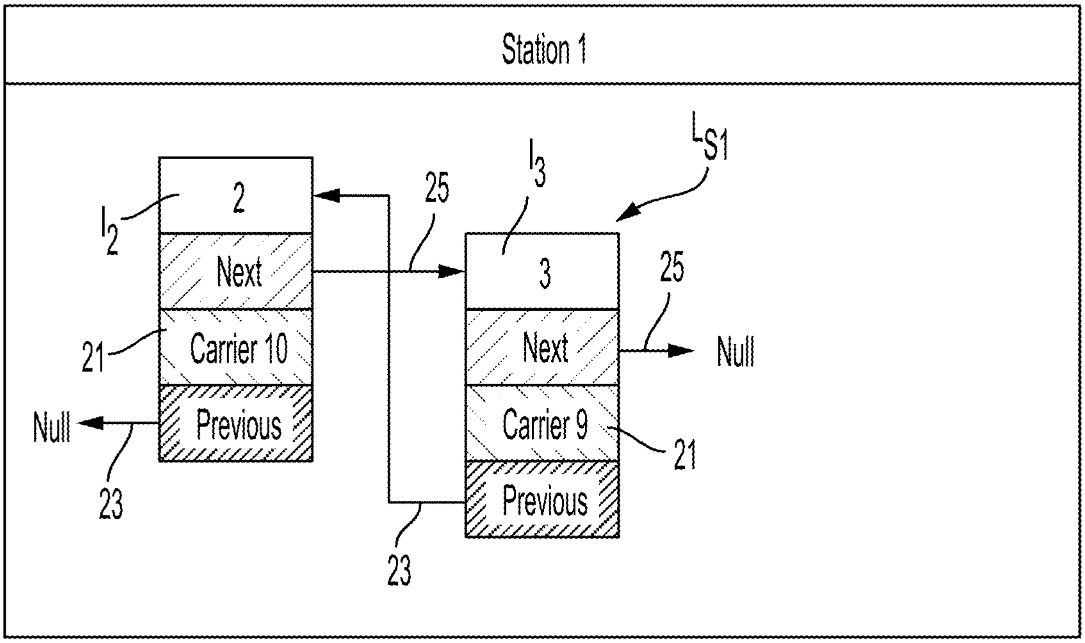
Figure 4:
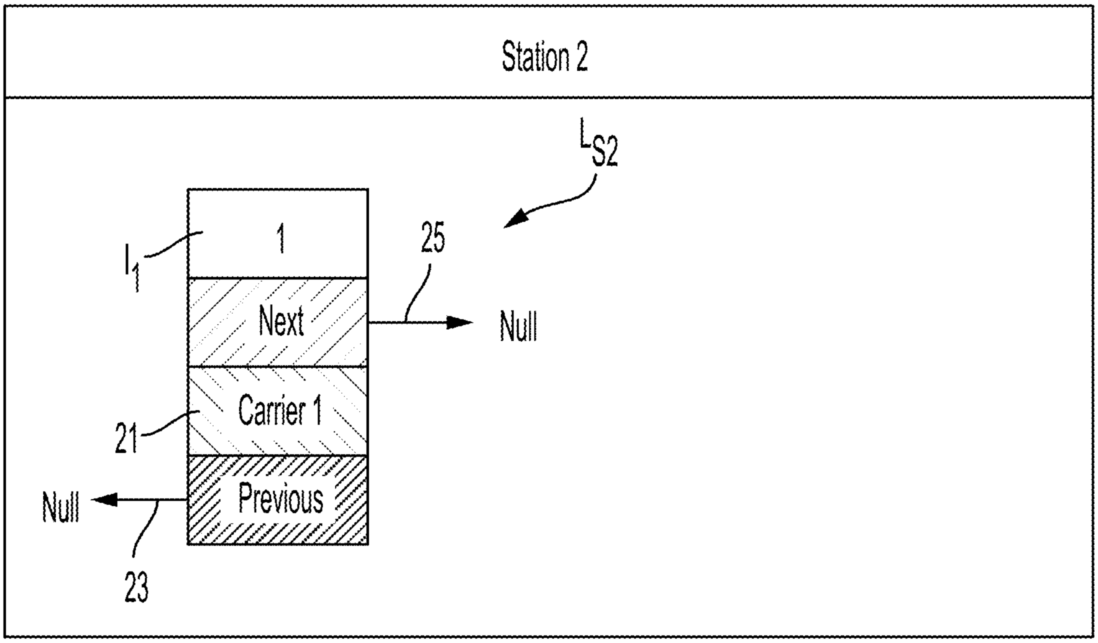

The invention will be described schematically and by way of example with reference to the drawings. It is shown therein:

FIG. 1 a plan view of a transport system configured as a multi-carrier system in accordance with an embodiment;

FIG. 2 an example of a list of a station with which three transport elements are associated;

FIG. 3 the list from FIG. 2 after the first instance in the list has been transferred to a following station; and FIG. 4 the list of the following station after the first instance of the list from FIG. 2 has been transferred to it.

FIG. 1 schematically shows, in a plan view, a transport system 10 that is configured as a multi-carrier system and that has a plurality of linear motors 11 that in the present embodiment are arranged in a row closed in itself and form a closed guide track 13 for transport elements 15, 17, 19. For an illustrative description, only three transport elements 15, 17, 19 are shown in FIG. 1, namely a first transport element 15, a second transport element 17, which is located directly before the first transport element 15 in the direction of movement x, and a third transport element 19 that is located directly behind the first transport element 15 in the direction of movement x. "Directly" is in this respect not to be understood as referring to a specific distance between the respective transport elements 15, 17, 19, but rather means that there is no further transport element between directly consecutive transport elements 15, 17, 19.

The transport elements 15, 17, 19 are magnetically driven by the linear motors 11. For this purpose, the transport elements 15, 17, 19 have one or more permanent magnets, not shown, that are acted on by a driving force by means of a changing and/or wandering magnetic field that is generated by the linear motors 11. The driving force leads to a movement of the transport elements 15, 17, 19 along the guide track 13. The transport elements 15, 17, 19 can in particular be moved independently and separately from one another. The linear motors 11 are controlled by a control unit, not shown, to drive the respective transport elements 15, 17, 19.

As can be seen from FIG. 1, a plurality of stations $S_1$, $S_2$, $S_3$ are arranged along the guide track 13 and can, for example, be defined by their position in the direction of movement x along the guide track 13. At the stations, transport elements 15, 17, 19 can, for example, be combined or separated again or can pick up a product for transport or deliver it again. For example, the transport elements 15, 17, 19 can receive an instruction from the control unit that allows the respective transport element to move from station $S_1$ to station $S_2$. Such instructions are also designated as a travel job. In FIG. 1, each of the stations $S_1$, $S_2$, $S_3$ is arranged at a separate position or coordinate along the guide track 13. In principle, it can alternatively also be implemented that the stations $S_1$, $S_2$, $S_3$ that are purely virtually defined by their position or coordinate along the guide track 13 in the present embodiment are completely or partly arranged at identical positions or coordinates that can then perform different functions, for example.

Each of the transport elements 15, 17, 19 on the path is associated with exactly one of the stations $S_1$, $S_2$, $S_3$ at any point in time. This means that the respective station $S_1$, $S_2$, $S_3$ is responsible for the transport elements 15, 17, 19 associated with it and can execute commands for the transport elements 15, 17, 19, in particular for stopping or driving, by means of the control unit.

FIG. 2 shows an example of an association in accordance with the invention of three transport elements with one station, wherein FIG. 2 is to be understood as a purely schematic reproduction of a data structure used as an example.

In accordance with the invention, an instance is created for each transport element (also referred to as a carrier, a mover, or a runner) that is located on the path. If, for example, twenty transport elements are moved on the path, twenty instances are created so that there is a corresponding pool with one instance for each transport element. This in particular takes place in a central memory area of the control unit that is provided centrally for the maximum number of transport elements. FIG. 2 shows, by way of example, a list $L_{S1}$ of a station (referred to as "Station 1"). The list $L_{S1}$ can also be called a chain and includes three instances $I_1$, $I_2$, $I_3$ that are each associated with a transport element.

Each of the instances $I_1$, $I_2$, $I_3$ is provided with an identification feature 21 that uniquely identifies the transport element corresponding to the respective instance $I_1$, $I_2$, $I_3$ ("Carrier 1", "Carrier 10", "Carrier 9"). Furthermore, each instance $I_1$, $I_2$, $I_3$ has a link 23 to the instance of the transport element directly ahead of the observed transport element and a link 25 to the instance of the transport element directly behind the observed transport element. The links 23, 25 are in particular configured as pointers that refer to the memory areas of the respective target elements. If it is the foremost transport element in the direction of movement x or the last transport element in the direction of movement x that is associated with the corresponding station, the respective links 23, 25 are marked as links to nothing, namely here as a null reference, see the link 23 of the instance $I_1$ and the link 25 of the instance $I_3$.

With this data structure, an overview results for the station at any point in time, on the basis of its list, of all the transport elements associated with the station, their logical sequence along the direction of movement x and, based on the null references, also an overview of which transport element is the first or the last transport element along the direction of movement x that is associated with the station. Significant memory savings can be achieved in this respect since sufficient memory for the maximum number of transport elements does not have to be provided for each station. Rather, a global pool of instances, which are each associated with a list or chain, is created. Furthermore, an additional management of the sequence of the transport elements associated with the station along the path is obsolete. The station that will always grant the next travel job to the first element of the list or chain that is linked to this foremost transport element can always address the corresponding transport element via the first entry of its list.

FIGS. 3 and 4 illustrate the transfer of a transport element from one station ("Station 1" in accordance with FIG. 3) to the station directly following it in the direction of movement x ("Station 2" in accordance with FIG. 4). FIG. 3 substantially corresponds to FIG. 2, wherein the instance $I_1$ shown in FIG. 2, corresponding to the foremost transport element in the direction of movement x that is assigned to the station, has already been transferred to the next station and has therefore been removed from the list $L_{S1}$. The link 23 of the instance $I_2$ has been changed accordingly to a null reference so that it can be seen that "Carrier 10" is the foremost transport element in the direction of movement x that is currently associated with "Station 1".

In accordance with FIG. 4, the list $L_{S2}$ of the station directly following in the direction of movement x ("Station 2") includes the instance $I_1$, which was previously associated with Station 1, as the only entry after the transfer. That is, Station 2 is assigned exclusively to Carrier 1. Accordingly, both links 23, 25 are provided with a null reference.

In an implementation with pointers as links 23, 25, the transfer of the respective instances can therefore already be effected by overwriting the memory addresses to which the respective pointers refer in each case so that the transferred instance is correctly removed from the list or chain link of the preceding station and is added to the list or chain link of the following station.

The transfer takes place in an event-controlled manner without separate transfer points being required that are also designated as "trigger points". Only a defined transfer condition is required. This can be, for example, that the transport element has been set into motion or has reached a certain transfer speed. Thus, it is, for example, possible for the transport element to be transferred to the following station directly after starting to move, even if it has not yet arrived there. A stopping at a waiting position or transfer position is then not necessary if the receiving station is free. If the currently executed transport job goes beyond the receiving station and the receiving station is free, the latter can even directly transfer the transport element further to the next following station. The travel time can thus already be used to prepare commands for the transport element. Ideally, unnecessary stopping processes for the respective transport element can be avoided.

The method described here thus leads, on the one hand, to memory savings and, on the other hand, also to an improved and simplified handling of transport elements on the path.

REFERENCE NUMERAL LIST

10 transport system
11 linear motor
13 guide track
15 first transport element
17 second transport element
19 third transport element
21 identification feature
23 link
25 link
$I_1$ instance
$I_2$ instance
$I_3$ instance
$L_{S1}$ list (station 1)
$L_{S2}$ list (station 2)
$S_1$ station
$S_2$ station
$S_3$ station
x direction of movement

The invention claimed is:

1. A method for operating a transport system comprising:
a plurality of linear motors that are arranged in a row and have a guide track,
a plurality of transport elements that can be moved along the guide track by means of the linear motors, and
a plurality of stations along the guide track,
wherein each of the transport elements is associated with one of the stations, and wherein the method comprises:
generating an instance for each of the transport elements,
generating a list for each of the stations, wherein the instance for each of the transport elements associated with a respective station is associated with a respective list, and wherein, within the respective list, a first instance of each respective transport element is linked to a second instance of a transport element directly ahead of the respective transport element and to a third instance of a transport element directly behind the respective transport element,
transferring a target transport element from a first station to a directly following second station and inserting an instance of the target transport element into the list of the second station if a transport job that goes beyond the first station is present for the target transport element, wherein the transfer takes place in an event-controlled manner and independently of a transfer point if a predetermined transfer condition is fulfilled, and
controlling the plurality of linear motors to execute travel jobs of the transport elements.

2. The method in accordance with claim 1,
wherein the transfer condition is fulfilled when the target transport element has set off and/or has reached a predetermined transfer speed.

3. The method in accordance with claim 1, wherein each instance has a first link to an instance of the transport element directly in front of the respective transport element, a second link to an instance of the respective transport element directly behind the respective transport element, and an identification feature for the respective transport element.

4. The method in accordance with claim 3,
wherein both links are configured as pointers referring to memory addresses of each instance corresponding to each respective link.

5. The method in accordance with claim 4,
wherein transfer of an instance of the target transport element that was transferred from the first station to the directly following second station takes place by overwriting the memory addresses referred to by pointers corresponding to the instance of the target transport element.

6. The method in accordance with claim 1, wherein the transport system has a control unit and a memory area for creating an instance for each of the transport elements is provided in the control unit.

7. The method in accordance with claim 1, wherein the stations are at least partly arranged at identical positions along the guide track.

8. A transport system that comprises a plurality of linear motors that are arranged in a row and have a guide track, a plurality of transport elements that can be moved along the guide track by means of the linear motors, and a plurality of stations along the guide track, and further comprising a control unit that is configured to carry out the method in accordance with claim 1.

9. The transport system in accordance with claim 8, wherein the stations are at least partly arranged at identical positions along the guide track.

10. The transport system in accordance with claim 8 that is a multi-carrier system.

11. The method in accordance with claim 1, wherein the transport system is a multi-carrier system.

12. The method in accordance with claim 1, wherein the transport system is a multi-carrier system.

13. A transport system comprising:

plurality of linear motors that are arranged in a row and have a guide track;

a plurality of transport elements that can be moved along the guide track via the plurality of linear motors;

a plurality of stations along the guide track; and a control unit configured to at least:

generate an instance for each of the transport elements;

generate a list for each of the stations, wherein the instance for each of the transport elements associated with a respective station is associated with a respective list, and wherein, within the respective list, a first instance of each respective transport element is linked to a second instance of a transport element directly ahead of the respective transport element and to a third instance of a transport element directly behind the respective transport element;

cause transfer of a target transport element from a first station to a directly following second station and inserting an instance of the target transport element into the list of the second station if a transport job that goes beyond the first station is present for the target transport element, wherein the transfer takes place in an event-controlled manner and independently of a transfer point if a predetermined transfer condition is fulfilled; and control the plurality of linear motors to execute travel jobs of the transport elements.

14. The transport system in accordance with claim 13, wherein the transfer condition is fulfilled when the target transport element has set off and/or has reached a predetermined transfer speed.

15. The transport system in accordance with claim 13, wherein each instance has a first link to an instance of the transport element directly in front of the respective transport element, a second link to an instance of the respective transport element directly behind the respective transport element, and an identification feature for the respective transport element.

16. The transport system in accordance with claim 15, wherein both links are configured as pointers referring to memory addresses of each instance corresponding to each respective link.

17. The transport system in accordance with claim 16, wherein transfer of an instance of the target transport element that was transferred from the first station to the directly following second station takes place by overwriting the memory addresses referred to by pointers corresponding to the instance of the target transport element.

18. The transport system in accordance with claim 13, wherein the control unit includes a memory area for creating an instance for each of the transport elements.

19. The transport system in accordance with claim 13, wherein the stations are at least partly arranged at identical positions along the guide track.

20. The transport system in accordance with claim 13, wherein the plurality of transport elements are magnetically driven.

* * * * *